No. 861,222. PATENTED JULY 23, 1907.
F. H. NEWLOVE.
SELF SETTING RAT AND MOUSE TRAP.
APPLICATION FILED FEB. 16, 1907.
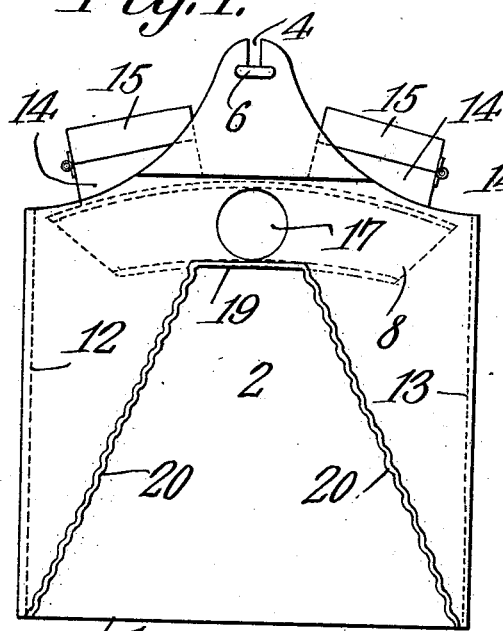
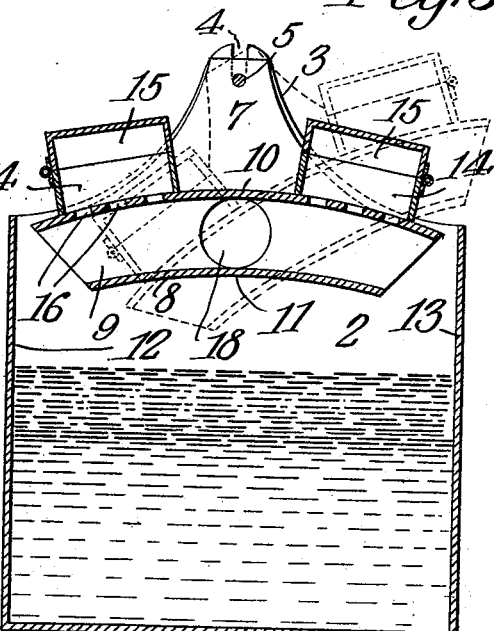
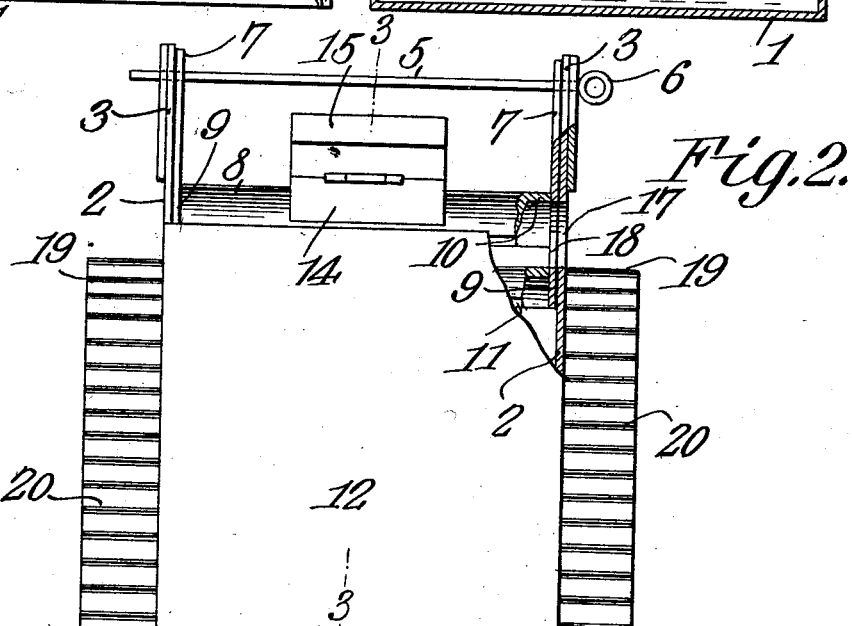
WITNESSES: Frank H. Newlove, INVENTOR,
By ATTORNEYS

UNITED STATES PATENT OFFICE.

FRANK H. NEWLOVE, OF CORNING, KANSAS, ASSIGNOR OF ONE-HALF TO WILLIAM E. NEWLOVE, OF ST. JOSEPH, MISSOURI.

SELF-SETTING RAT AND MOUSE TRAP.

No. 861,222.        Specification of Letters Patent.        Patented July 23, 1907.

Application filed February 16, 1907. Serial No. 357,700.

*To all whom it may concern:*

Be it known that I, FRANK H. NEWLOVE, a subject of the King of England, residing at Corning, in the county of Nemaha and State of Kansas, have invented a new and useful Self-Setting Rat and Mouse Trap, of which the following is a specification.

This invention relates to animal traps of that class which have a swinging platform suspended from overhead bearings above a receptacle, and into which the animal is caused to fall through the oscillating movement of the platform set up by the animal therein.

The principal object of this invention is to provide a simple, cheap and efficient trap for capturing and killing rats, mice, and other small destructive animals; a trap which shall be self-setting and continuously baited; which shall be free from odor and always clean, and one that will cause the immediate death of the animal caught.

With these and other objects in view, the invention consists of a self-setting animal trap embodying novel features of construction and arrangement now about to be described and claimed.

In the accompanying drawings:—Figure 1 is a view in side elevation of the improved trap. Fig. 2 is a similar view taken at a right angle to Fig. 1. Fig. 3 is a vertical central section on the line 3—3 of Fig. 2.

Similar numerals of reference are employed to indicate corresponding parts throughout the several figures of the drawings.

The bottom of the trap comprises a body or receptacle 1 made preferably of sheet metal rectangular in form and high enough to contain a sufficient quantity of water to drown any animal falling thereinto. The sides 2 extend above the top of the box in the form of ears 3 and are provided with slots 4 opening upwardly to serve as bearings for a bar or rod 5 which may be made of wire with its ends bent to form eyes 6 for retaining the bar or rod in place.

Suspended from the rod or bar 5 by ears or lug 7 is a swinging platform 8, also by preference made of metal, comprising two opposite vertically disposed side plates 9, on which the ears or lugs 7 are formed and between which sides extend two plates 10, 11, substantially parallel and separated sufficiently far to permit an animal entering between them. These plates are slightly convexed as shown, the free edges of the upper plate 10 reaching nearly to the sides 12, 13 of the receptacle 1 and close to the top thereof to prevent the escape of any animal entrapped. A bait box 14 is attached to the top plate near each edge and closed by a hinged cover 15. The bottom of the bait box formed by the top plate 10 is perforated at 16 that the animal may be attracted by the odor escaping therethrough.

A short distance below the pivot rod or bar 5 an opening 17 is made through each wall 2 of the receptacle at the top, through which the animal may enter the trap. Similar openings 18 registering with those 17 are formed in the side plates 9 of the swinging platform for the animal to pass through onto the plate 11 of said swinging platform. To enable animals to reach the openings 17, 18, a shelf 19 is secured to the outside of the receptacle 1 below the openings, and suitable corrugated or roughened approaches 20 lead from the bottom of the receptacle to the shelf 19.

The operation of the trap is very simple. The receptacle is about two-thirds filled with water and bait placed in the box 14, care being taken that the swinging platform hangs perpendicular and that the openings 17, 18 register. Rats and mice attracted by the odor of the bait or by thirst approach the trap and run onto the shelf 19, pass through the openings 17, 18, and find themselves on the curved plate 11 of the swinging platform 8. Any movement an animal may make to either side of the center will cause the platform to tip or swing and throw the animal into the water, the platform being then relieved of the weight of the animal returns to normal position. The plate 11 being of metal and somewhat polished no foot hold is afforded for the animal and by drowning the animal the trap does not become impregnated with the peculiar odor of rats and mice.

From the above it will be noted that the trap is self setting and that it always remains baited, the captured animal not having time nor being able to assume a position to permit him to nibble the bait. The trap is quickly emptied by lifting the platform 8 off the ears 3 and pouring out the contents.

I claim:—

1. An animal trap comprising a reservoir, an upwardly curved swinging platform suspended from said reservoir below its center of oscillation, a curved cover plate above said platform having perforations therein and a bait container at each end over said perforations, said reservoir having an opening on each side for the entrance of animals, and an opening in each platform support adapted to register with the openings in the reservoir.

2. An animal trap comprising a reservoir, pivotally supported side plates, an upwardly curved swinging platform and cover plate attached to said pivoted side plates forming a runway, said cover plates having perforations near each end and a bait container above said perforations, said reservoir and side plates having openings adapted to register for the entrance of animals, the openings in said side plates being disposed centrally above said curved platform.

3. An animal trap comprising a reservoir with upstanding ears, a swinging platform suspended in said reservoir and having upstanding lugs, a bar or rod carried by said lugs, and supported by said ears, said reservoir and platform having registering openings for the entrance of animals to be caught, and bait containers carried by said swinging platform.

In testimony that I claim the foregoing as my own, I have hereto affixed my signature in the presence of two witnesses.

FRANK H. NEWLOVE.

Witnesses:
  F. L. BIGELOW,
  J. E. WOODWORTH.